US005610994A

United States Patent [19]
Stadtfeld et al.

[11] Patent Number: 5,610,994
[45] Date of Patent: Mar. 11, 1997

[54] DIGITAL IMAGING OF TOOTH CONTACT PATTERN

[75] Inventors: Hermann J. Stadtfeld, Rochester; John W. Swanger, Jr., Fairport, both of N.Y.

[73] Assignee: The Gleason Works, Rochester, N.Y.

[21] Appl. No.: 433,582

[22] Filed: May 3, 1995

[51] Int. Cl.$^6$ ............................................. G06K 9/00
[52] U.S. Cl. ........................................ 382/152; 73/162
[58] Field of Search ................................... 382/100, 141, 382/152, 217, 218; 73/162; 33/501.7, 501.8; 348/87, 94, 95, 125, 128, 129, 130; 356/394; 364/474.17, 551.02

[56] References Cited

U.S. PATENT DOCUMENTS

| | | | |
|---|---|---|---|
| 3,795,143 | 3/1974 | Deprez et al. | 73/162 |
| 5,083,458 | 1/1992 | DeGeorge et al. | 73/162 |
| 5,287,293 | 2/1994 | Chen et al. | 364/551.01 |
| 5,373,735 | 12/1994 | Gutman | 73/162 |

FOREIGN PATENT DOCUMENTS

| | | | |
|---|---|---|---|
| 4-36632 | 2/1992 | Japan | G01M 13/02 |
| 4-254733 | 9/1992 | Japan | 73/162 |

OTHER PUBLICATIONS

Patents Abstracts of Japan, vol. 15, No. 287, (P-1229), Jul. 22, 1991, Japanese Patent Application No. 3-100434, Nissan Motor Co. Ltd., Apr. 25, 1991.

*Primary Examiner*—Andrew Johns
*Attorney, Agent, or Firm*—Robert L. McDowell; Ralph E. Harper

[57] ABSTRACT

A method of determining a contact pattern representative of the contact patterns on successive gear teeth. The method comprises providing a first digital image comprising actual drive side or coast side tooth surfaces comprising contact patterns of a plurality of successive gear teeth, and, providing a second digital image comprising one of respective drive side or coast side theoretically correct tooth surfaces of the same successive gear teeth. Each theoretically correct tooth surface is represented by a matrix grid comprising a plurality of grid elements. The theoretically correct tooth surfaces are superimposed on the respective actual tooth surfaces image to congruently match the actual tooth surfaces image to the respective theoretically correct tooth surfaces. The grid elements of each theoretically correct tooth surface which contain at least a portion of a contact pattern image are then identified. A consolidation matrix grid comprising a number of grid elements equal to the number of grid elements in the theoretically correct tooth surface grid matrix is provided and grid elements in the consolidation matrix grid corresponding to respective identified grid elements in each of the theoretically correct matrix grids are identified. The identified grid elements in the consolidation matrix represent a consolidated contact image for the successive gear teeth. The consolidated contact image in the consolidation matrix may then be transformed to an axial plane tooth projection illustrating the consolidated contact image.

9 Claims, 10 Drawing Sheets $C_{28}(10, 24) =$ $C_{30}(10, 24) =$ $c_{32}(10,24) =$ $c_{34}(10,24) =$ $C_{TOTAL}=$

DIGITAL IMAGING OF TOOTH CONTACT PATTERN

FIELD OF THE INVENTION

The present invention is directed to the testing of gears to determine contact patterns and in particular to a method of representing tooth contact patterns by digital imaging.

BACKGROUND OF THE INVENTION

Running a pair of bevel or hypoid gears together in mesh for testing purposes in order to determine their running qualities and/or tooth bearing contact is well known in the art of gearing. Machines for performing such testing are equally known and are generally exemplified by U.S. Pat. No. 3,795,143 to Deprez et al.

In testing bevel or hypoid gears to determine the pattern of contact between the teeth of the gear pair, it is customary to coat the tooth surfaces of one member of the pair, usually the gear member, with a marking compound and then run the pair together under a light load. Marking compound will be removed from areas of the gear tooth surface which come into contact with tooth surfaces of the mating pinion member resulting in a contact pattern or "footprint" being revealed on the tooth surfaces of the gear.

In evaluating the contact patterns on tooth surfaces, it has been the practice to visually inspect the pattern on each tooth to determine if a part is accepted or rejected. If contact patterns are deemed to be out of the desired position, adjustments are made to the relative positions of the gear pair which will yield the desired patterns of contact.

Aside from the visual approach being time consuming, the procedure is not always accurate in that the relative position of the eyes of the viewer is likely to change from gear-to-gear. Thus tooth contact patterns will be evaluated from a slightly different point of origin. Also, it is the nature of the human eye to evaluate a contact pattern as though the tooth surface were flat when in fact, tooth surfaces of bevel and hypoid gears are usually curved in both profile and lengthwise directions, further adding visual distortion to the viewed contact pattern.

Attempts have been made to replace human visual inspection of contact patterns with electronic capturing of a tooth contact pattern. One such approach is shown in U.S. Pat. No. 5,373,735 to Gutman wherein a strobe light and charge coupled device (CCD) video camera are timed with the rotation of a gear member to capture individual contact patterns of successive teeth while the gear member is rotating. The images are digitized and stored in a computer for analysis and may be displayed individually or several may be superimposed on one another to illustrate tooth-to-tooth changes in the contact pattern.

Another manner in which to gear tooth contact patterns may be evaluated is shown in Japanese published patent application no. 04-36632 to Mazda Motor Corporation. This disclosure teaches coating the tooth surfaces with a type of paint substance and viewing the painted tooth surfaces with a CCD camera and storing the images in a computer. The gear pair is run together and the tooth surfaces are again viewed with the video camera to obtain another set of images. The painted image of each tooth after running the gear pair together is then subtracted from the respective painted image obtained prior to running. What remains is illustrative of the contact pattern.

One significant problem inherent in both methods discussed above is that although a contact pattern for each tooth surface is produced, there is no point of reference available when the image is viewed. In other words, the contact image is not assigned to any particular coordinate system (two-dimensional or three-dimensional) which makes it impossible to know the exact location of the contact pattern on the tooth surface. Viewing the contact pattern is insufficient if there is no reference to its position with respect to a tooth surface in that although the shape of contact may be defined, its position relative to the boundaries of the tooth surface is not known and, therefore, a complete and thorough evaluation of the tooth contact pattern cannot be conducted.

Another disadvantage to the above processes, including human visual inspection, is that the contact pattern obtained is not in a form that will permit its direct comparison to ideal contact patterns obtained by tooth contact analysis (TCA) methods. TCA patterns are represented as axial plane projections of a contact pattern on an appropriate tooth surface. Positioning of the contact pattern on a surface representative of the appropriate tooth is not found in the teachings discussed above.

It is an object of the present invention to provide a method of determining contact patterns of gear tooth surfaces by video digital imaging and providing an accurate frame of reference in which to consider the results obtained.

It is a further object of the present invention to simultaneously view and consider image data from a plurality of tooth surfaces in contrast to single tooth viewing methods of the prior art in order to obtain a consolidated contact pattern representative of a plurality of successive tooth surface contact patterns.

SUMMARY OF THE INVENTION

The present invention is directed to a method of determining a contact pattern representative of the contact patterns on successive gear teeth. The method comprises providing a first digital image comprising one of (1) the drive side tooth flank surfaces comprising contact patterns of a plurality of successive gear teeth or (2) the coast side tooth flank surfaces comprising contact patterns of a plurality of successive gear teeth, and, providing a second digital image comprising one of (1) respective drive side theoretically correct tooth surfaces of the same successive gear teeth or (2) respective coast side theoretically correct tooth surfaces of the same successive gear teeth.

Each theoretically correct tooth surface is represented by a matrix grid comprising a plurality of grid elements. The theoretically correct tooth surfaces are superimposed on respective tooth flank surfaces comprising contact pattern images to congruently match the tooth flank surfaces (and hence the contact pattern images) to the respective theoretically correct tooth surfaces. The grid elements of each theoretically correct tooth surface which contain at least a portion of a contact pattern image are then identified.

A consolidation matrix grid comprising a number of grid elements equal to the number of grid elements in the theoretically correct tooth surface grid matrix is provided and grid elements in the consolidation matrix grid corresponding to respective identified grid elements in each of the theoretically correct matrix grids are identified. The identified grid elements in the consolidation matrix represent a consolidated contact image for the successive gear teeth.

The consolidated contact image in the consolidation matrix may then be transformed to an axial plane projection illustrating the consolidated contact image or may be shown in three-dimensional perspective.

DETAILED DESCRIPTION OF THE PREFERRED EMBODIMENTS

The preferred embodiments of the present invention will be discussed with reference to the accompanying drawings wherein similar features are referenced with like reference numbers.

Figure 1:
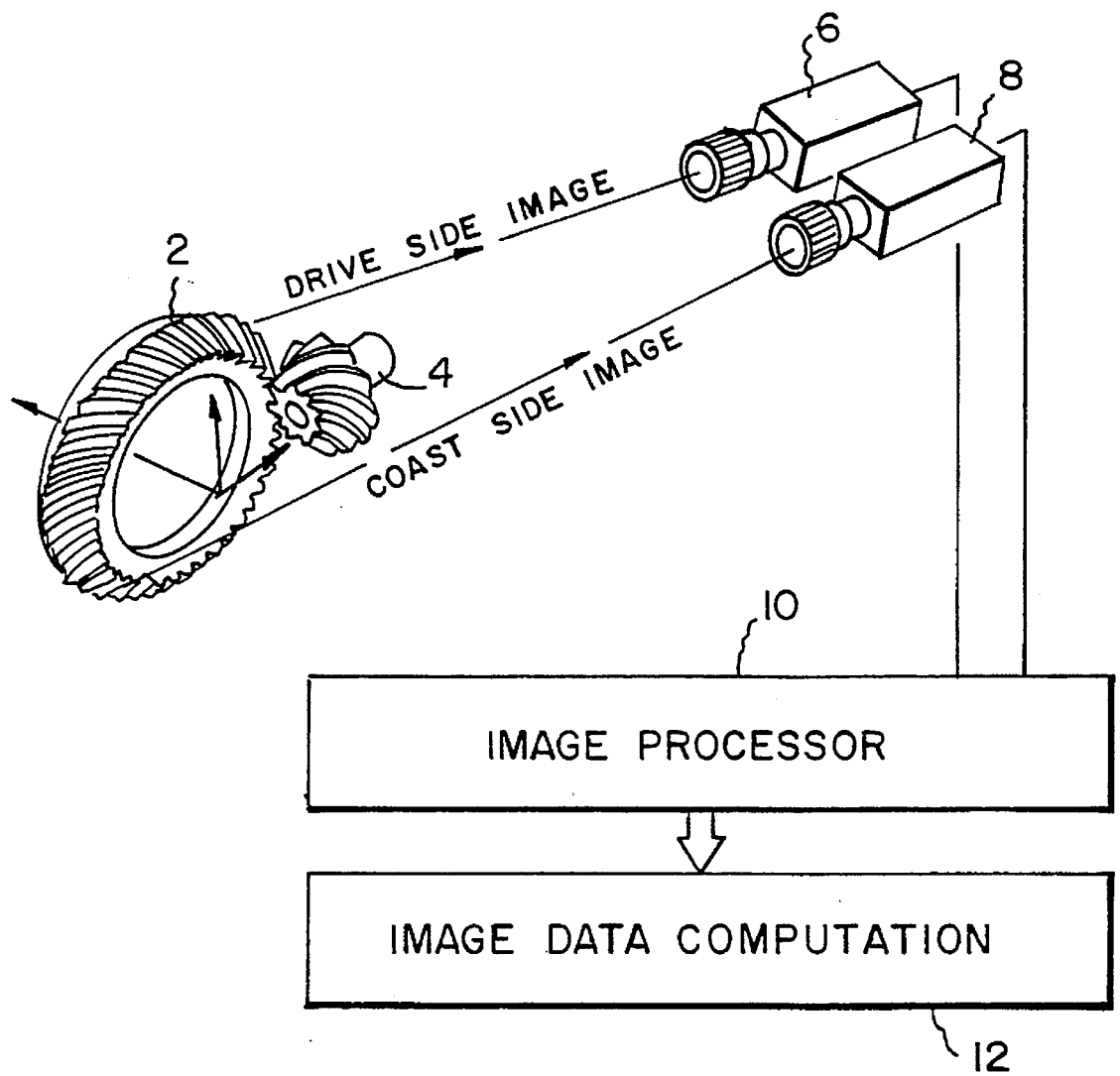
FIG. 1 illustrates image data flow for both drive side and coast side tooth surface contact patterns for the gear member of a hypoid gear pair.

FIG. 1 illustrates the image data flow of the present invention wherein a pair of hypoid gears comprising a gear member 2 and a pinion member 4 are relatively arranged in a meshing position as would be seen in a testing machine. For the purposes of the present invention, the testing machine may be any such machine capable of running the gear pair in a meshing relationship and producing visible contact patterns on the tooth surfaces of at least one member of the pair. Machines of this type are widely known and readily available. Further reference to particular testing machines or components thereof is not believed necessary for a complete understanding of the present invention.

It should be noted that while the present invention will be discussed with reference to coast side tooth surfaces and contact patterns, the following discussion applies equally to drive side tooth surfaces and contact patterns.

Preferably, tooth surfaces comprising contact images from the drive side and coast side of ring gear 2 are captured by respective individual video cameras 6, 8 of the type commonly referred to as charge coupled device (CCD) cameras. Generally, an image consists of 320×240 pixels for each camera. Images from the cameras are sent to a computer such as a personal computer (PC) comprising an image processor 10 for digitizing images from cameras 6 and 8 as is known in the art, and image data computation means 12 which defines the location and shape of the contact and displays the actual contact pattern on a monitor.

Figure 2:
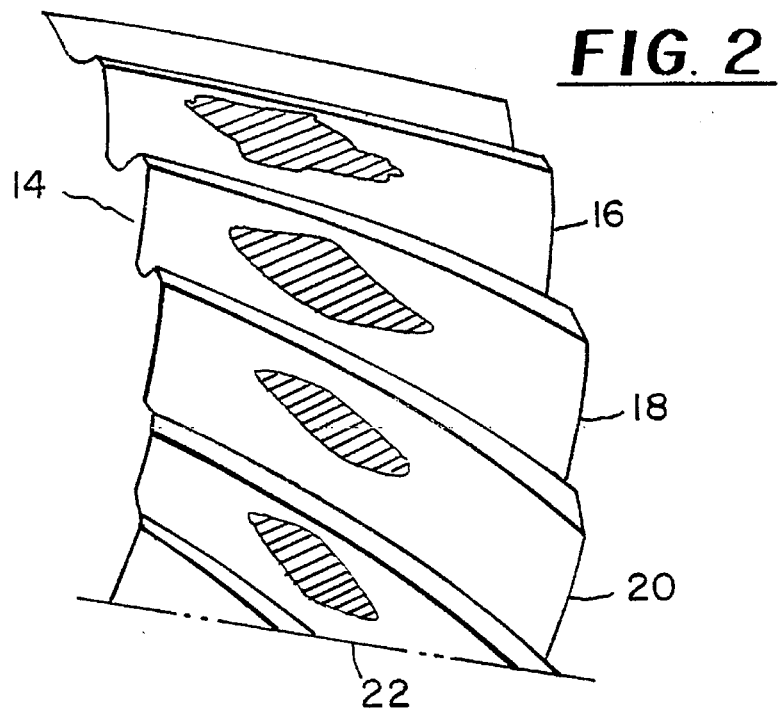
FIG. 2 shows a video image of a plurality of successive tooth surfaces with contact patterns from the coast side of the ring gear member of FIG. 1.

FIG. 2 shows a digitized video image of a plurality of successive tooth surface contact patterns 14 from the coast side of ring gear member 2. In a manner different from the prior art, the present invention considers more than one tooth surface contact pattern at a time, preferably three or four successive tooth surface contact patterns. FIG. 2 shows four successive tooth surface contact patterns 16, 18, 20, and 22. By this approach, the inventive method presents a simultaneous view of successive contact patterns from a single, fixed-positioned reference point which represents significantly more information than provided by the individually-viewed tooth surfaces of the prior art. Furthermore, the view of successive tooth contact surfaces from a single location point goes beyond the capabilities of human visual observation in that multiple tooth surfaces cannot easily be simultaneously viewed by the human eye without movement of the head or eye which results in different points of reference.

Figure 3:
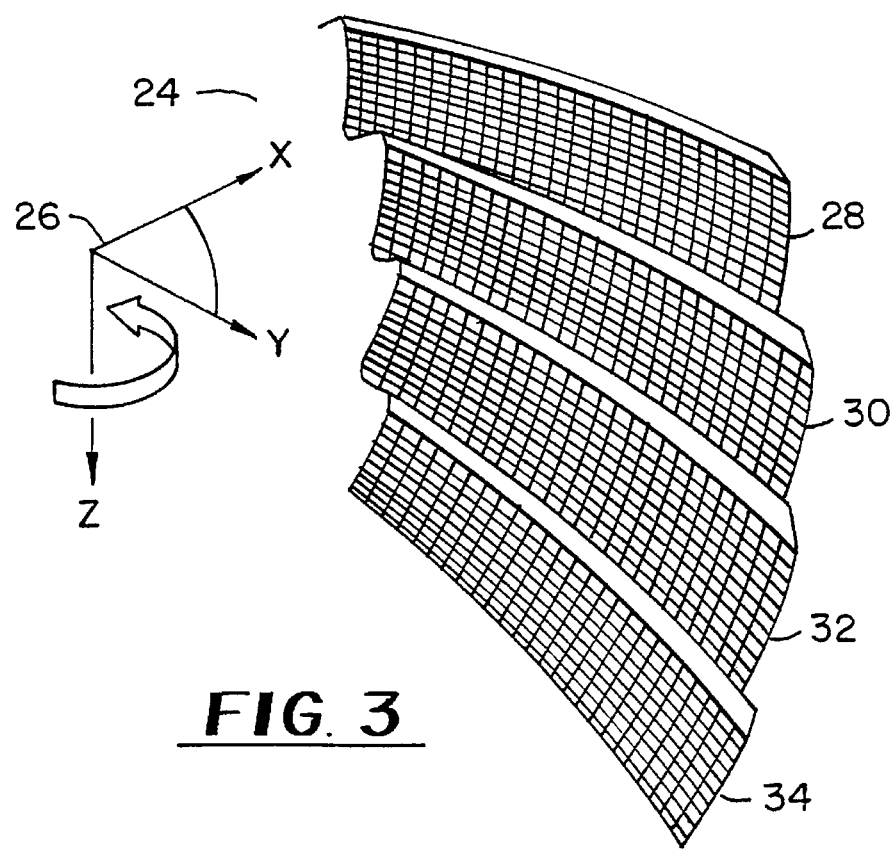
FIG. 3 is a theoretically correct representation of the plurality of tooth surfaces shown in FIG. 2 with each tooth surface presented in a grid pattern.

One of the deficiencies of prior art testing techniques has been the inability to present and analyze contact image data within the framework of defined and correctly-dimensioned tooth surface boundaries. The present invention addresses this insufficiency by providing a frame of reference in which the actual tooth contact may be accurately represented. FIG. 3 illustrates a theoretically correct representation of a gear segment 24 positioned in coordinate system 26 with the gear segment having a plurality of successive tooth surfaces 28, 30, 32, and 34. The surface of each tooth is divided into a grid pattern which will be explained in further detail below. The number of theoretically correct tooth surfaces of segment 24 corresponds to the same number of teeth viewed by the camera 8 and shown in FIG. 2. Tooth surfaces of gear segment 24 represent the theoretically correct form for the surfaces of the teeth of the gear member being viewed by the cameras 6 or 8.

Gear segment 24 is obtained from gear design summary information which is used to in a known manner to determine basic machine settings for gear manufacturing processes. The following is an example of design information summary information:

| | |
|---|---|
| number of teeth of gear | 35 |
| number of teeth of pinion | 13 |
| spiral angle | 30 degrees |
| pressure angle | 20 degrees |
| hand of spiral of pinion (left or right) | left hand (LH) |
| face width | 32.0 mm |
| middle ring gear diameter | 138.6 mm |
| radius to flank center | 95.34 mm |
| dedendum factor | 0.150 |
| gear set shaft angle | 90 degrees |
| hypoid offset | 0.0 mm |
| cutter radius | 75.0 mm |
| method of cutting | generating |

From this design summary information, using T2000 or CAGE software commercially available from The Gleason Works, the following data is obtained:

| General Blank Data | | Gear Data | |
|---|---|---|---|
| Pinion Teeth | 13 | Addendum | 0.184495 |
| Gear Teeth | 35 | Dedendum | 0.155270 |
| D.P. | 4.258766 | Clearance | 0.020251 |
| Shaft Angle | 1.570796 | Whole Depth | 0.339764 |
| Gear Face | 1.259843 | Pitch Angle | 1.215161 |

-continued

| | | | |
|---|---|---|---|
| Pinion Face | 1.258943 | Face Angle | 1.293544 |
| Offset | 0.00 | Root Angle | 1.215161 |
| Phi 1 | 0.349066 | Out. Dia. | 8.346820 |
| Phi 2 | −0.349066 | Back Angle | 0.00 |
| Spiral Angle | 0.523599 | Front Angle | 0.00 |
| AO | 0.00 | Delta R | 0.00 |
| YM - OB | 0.00 | GR | −0.165634 |
| YM - IB | 0.00 | BO | 1.353311 |
| Cutter Rad. | 0.00 | BI | 1.007412 |
| Orig. Prog. | | PABCP | 0.00 |

| Gear IB Finishing Data | | Gear IB Finishing Data | |
|---|---|---|---|
| S | 3.424114 | Tip Blade Angle | 0.349066 |
| I | 0.00 | Delta XS | 900.00 |
| J | 0.00 | Y | 0.00 |
| EM | 0.00 | Calc RHO | 393.7007 |
| Root Angle | 1.215161 | Basic RA | 1.066752 |
| Delta XP | 0.00 | 2C | 0.00 |
| Delta XB | 0.00 | 6D | 0.00 |
| Calc RCP | 2.994528 | | |

The basic machine settings describe the relative motion between a tool and workpiece to form the desired tooth surfaces. The determined relative path of the tool and workpiece thus describes a theoretical tooth surface and it is this tooth surface, which can be output by the software identified above, presented in FIG. 3.

The theoretically correct tooth surfaces of FIG. 3, located at defined points in the coordinate system 26, presents the advantage of knowing in advance what the tooth form of the imaged object (FIG. 2, for example) has to look like which brings a new perspective to tooth contact recognition.

Figure 4:
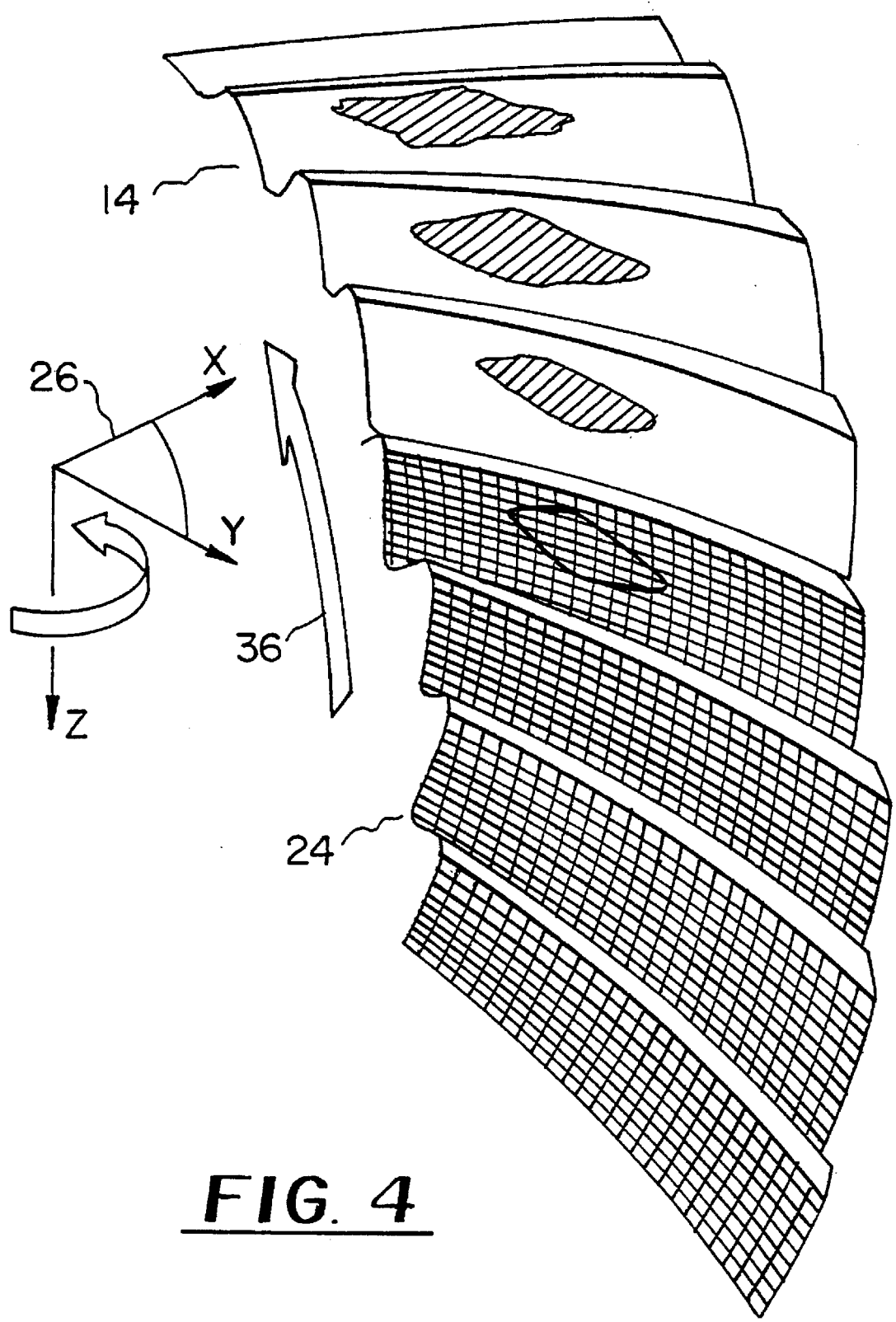
FIG. 4 illustrates positioning the video image contact pattern of FIG. 2 positioned adjacent the corresponding theoretically correct tooth surfaces of FIG. 3.

During set-up of a testing machine, an appropriate generated gear segment 24 is displayed on a monitor. The camera (6 or 8) is turned on and set to display a plurality (e.g. four) of successive coast side or drive side tooth surfaces 14 of a member of the gear pair, such as ring gear 2. The machine operator manipulates the camera to approximately match the digitized video image 14 with the theoretical segment image 24 as is shown in FIG. 4. This step enables the operator to initially position the video image as well as adjust the magnification of the camera if a significant difference is noted between the theoretical segment 24 and the video image 14.

Figure 5:
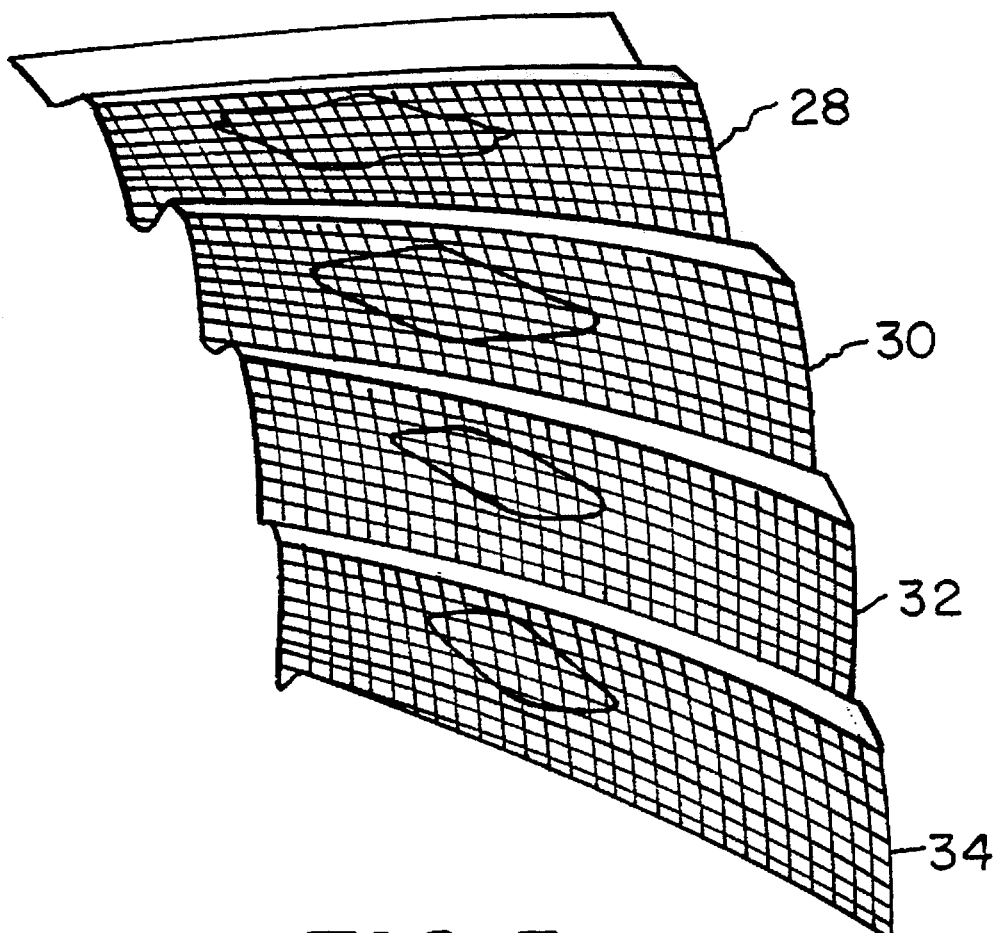
FIG. 5 illustrates the theoretically correct tooth surfaces of FIG. 3 congruently matched to the video image tooth surfaces of FIG. 2.

The next step in the inventive method is to congruently match the theoretical segment 24 to the video image 14. This operation is performed by rotating (arrow 36) the theoretical gear segment relative to the video image around and/or along axes X, Y, and Z and adjusting the magnification of the video image to place the theoretical tooth surfaces over the contact images to obtain the congruent match position shown in FIG. 5. The iterative matching process is performed by the computer and is defined as follows:

1. Linear movements along X, Y, and Z axes are used to receive a symmetric overlaid configuration between real (video) and theoretical segments;
2. Rotations around X and Y axes are applied to find a symmetric toe-heel relationship between real and theoretical segments;
3. A rotation around the Z axis follows to match slots and teeth between the real and theoretical segments;
4. The magnification of the real image is changed to receive a better adjustment between the real and theoretical segments, and,
5. Steps 1–4 are repeated if misalignment between real and theoretical segments still exists.

By matching the theoretical segment to the real video imaged segment, a coordinate system for the real segment is established since the video image now assumes the same coordinate system as that of the theoretical segment. Since the tooth surfaces of the theoretical segment are precisely known, the location and dimensions of the respective tooth surface contact patterns are now likewise precisely known. In comparison, in the prior art, the coordinate system of a video displayed contact pattern is defined by the manually set-up location of the camera position.

The picture pixels within the tooth contact pattern are allotted to a surface grid of, for example, 10×24 elements on a respective theoretical tooth. FIG. 3 illustrates such a grid on the surfaces of the theoretical teeth. Every grid element which overlays one or more contact pixels is identified and marked black. Thus, the overlay configuration of FIG. 5 can be represented by the grid display of FIG. 6 wherein each of the blackened grid elements corresponds to the position of at least one contact pixel in FIG. 5. Although at least one pixel is preferred in an effort to show all contact no matter how soft, an algorithm may be utilized which sets the minimum pixels required in any one grid element at any desired level in order to mark the grid as having contact. Also, ranges of pixels may be set forth with each range illustrated by a different shade of gray (or a different color) to indicate levels of contact, e.g. hard bearing, normal bearing, soft bearing.

Figure 6:
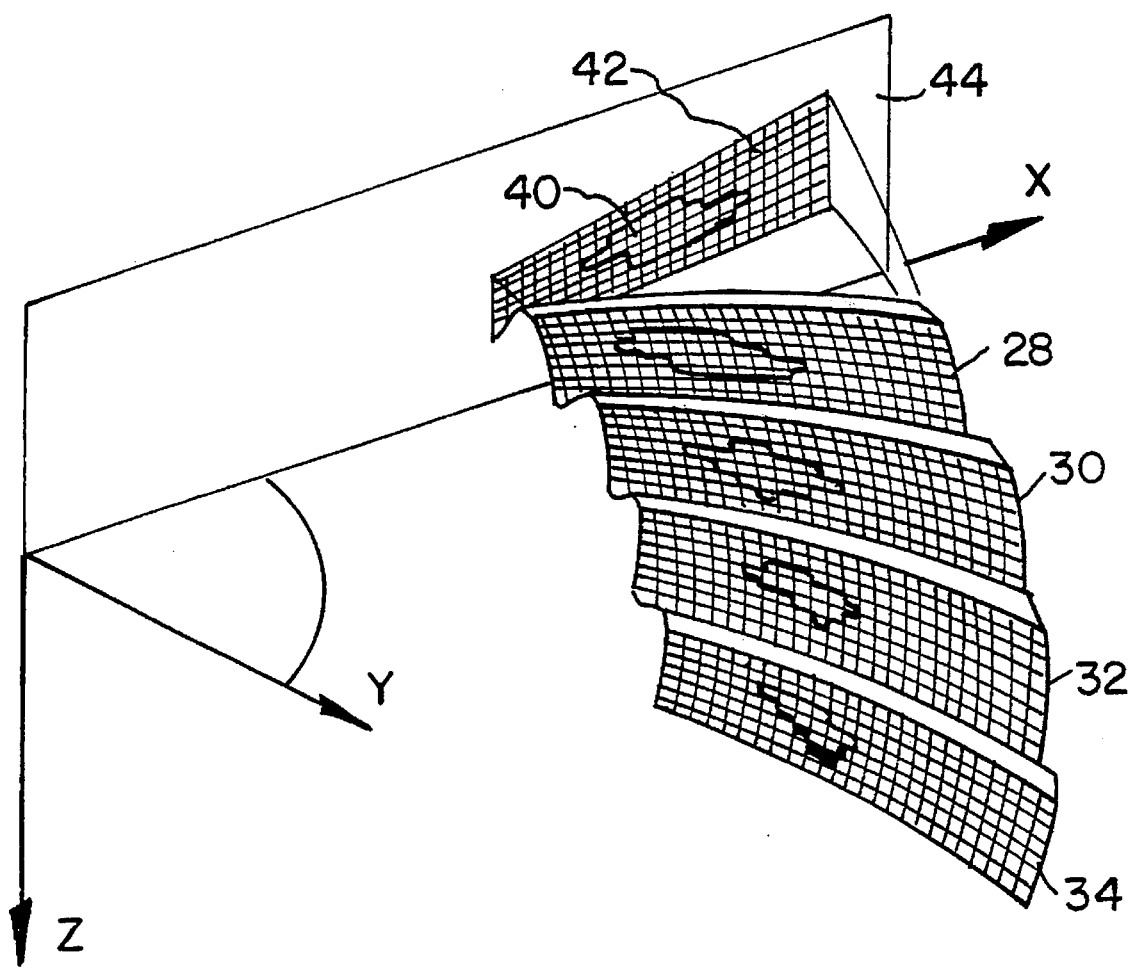
FIG. 6 shows a digital representation of FIG. 5 illustrating the contact patterns of FIG. 2 on the tooth surface grids of FIG. 3.
Figure 7A:
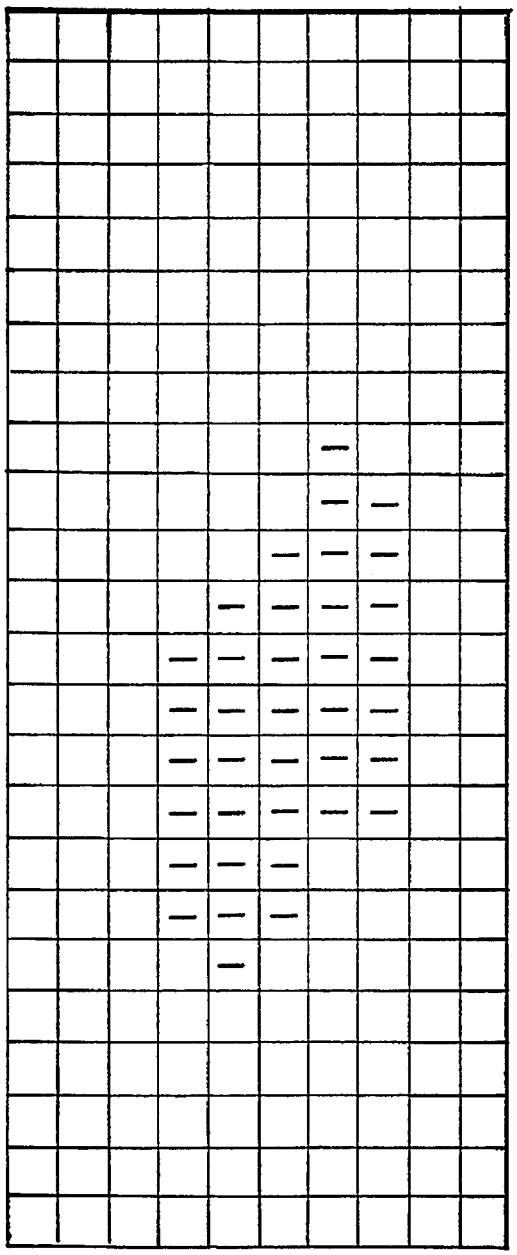
FIG. 7a, 7b, 7c, and 7d depict a binary representation of tooth contact for each tooth surface of FIG. 6.
Figure 7B:
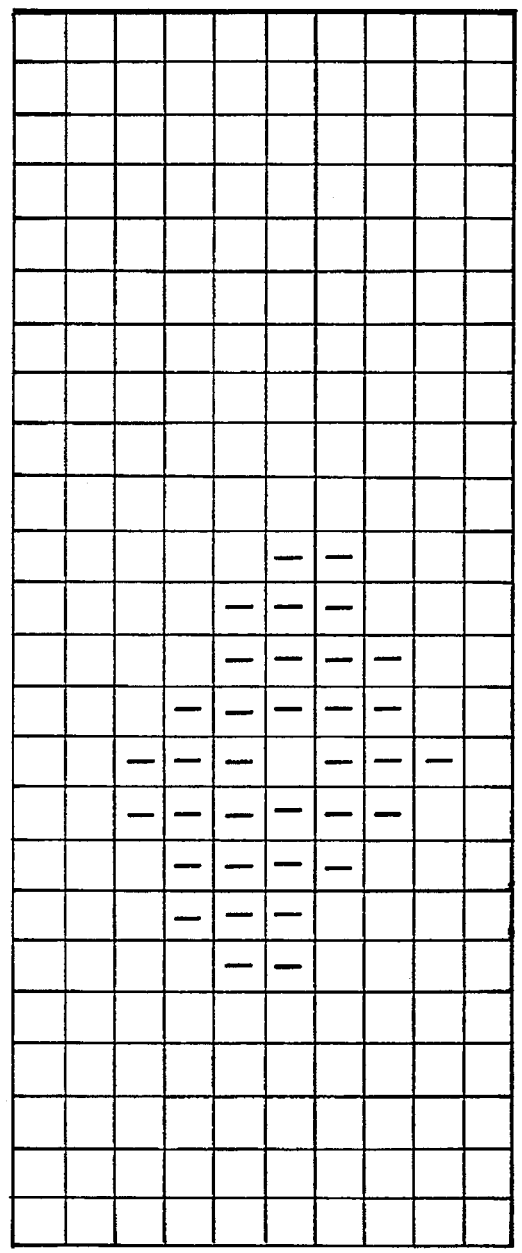
Figure 7C:
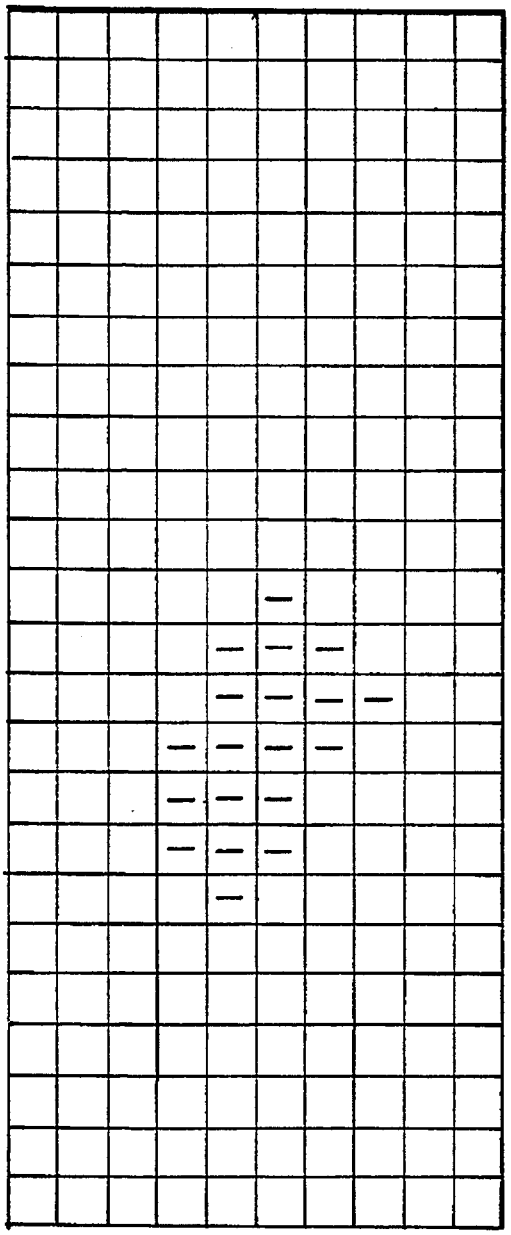
Figure 7D:
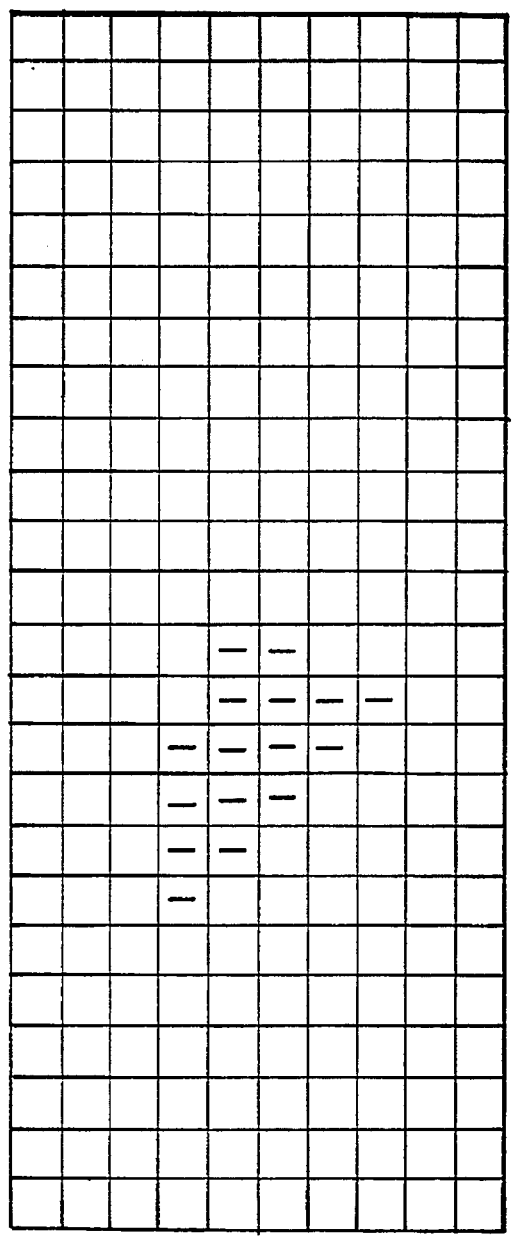

The contact observed in the tooth surface grid patterns of FIG. 6 may also be represented in an array or matrix such as shown in FIGS. 7(a)–7(d). The matrixes in these Figures contain an array of elements equal to those on the theoretical tooth surfaces of FIGS. 3–6 (e.g. 10×24) and in fact these matrixes $C_{28}$, $C_{30}$, $C_{32}$, and $C_{34}$ represent the same information as shown in FIG. 6 for respective tooth surfaces 28, 30, 32, and 34 except the blackened grid elements have been assigned a value of one (1) and all blank grid elements have been assigned a value of zero (0) which are shown as blanks in FIGS. 7(a)–7(d). Thus, FIGS. 7(a)–7(d) are binary representations of the contact shown in FIG. 2. It can be seen that, if desired, the overlay of FIG. 5 could easily be directly transformed to the matrixes of FIGS. 7(a)–7(d) by representing every grid element containing at least one contact pixel, with a value of one (1).

Figure 8:
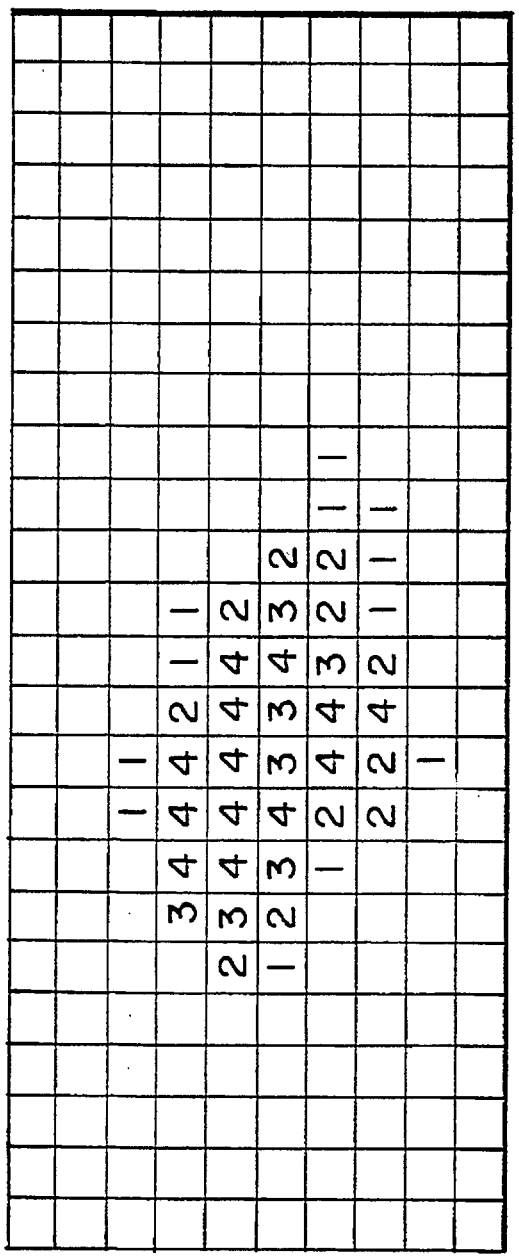
FIG. 8 is a numerical consolidation of the contact patterns shown in FIGS. 7(a)–7(d).
Figure 9:
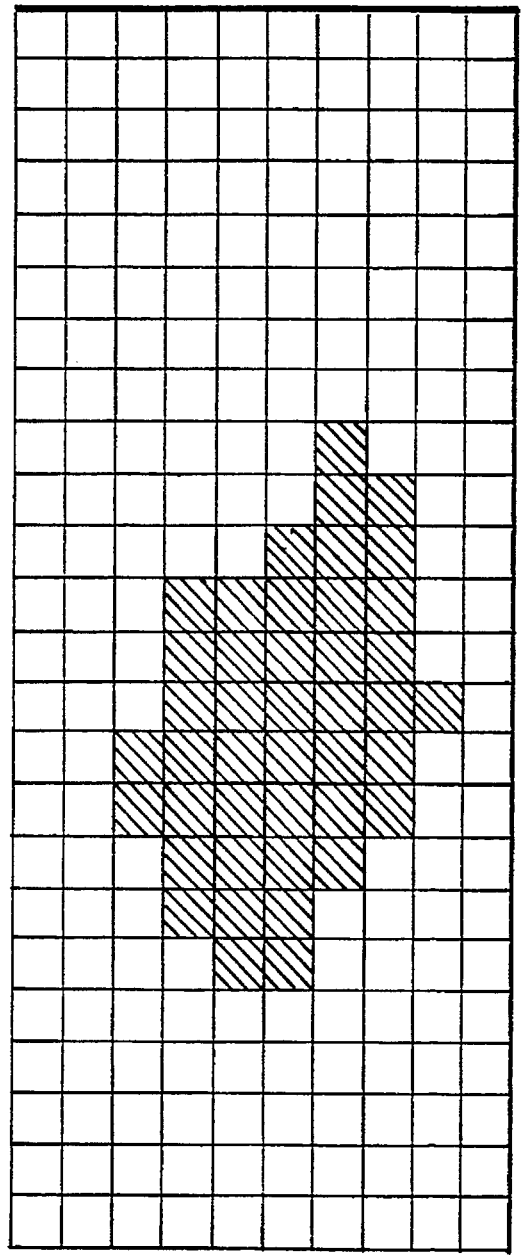
FIG. 9 illustrates a digital image of FIG. 8.

FIG. 8 illustrates a consolidation matrix $C_{Total}$ equaling the sum of each corresponding grid element in FIGS. 7(a), 7(b), 7(c), and 7(d) and representing the contact information of all tooth surfaces investigated being superimposed on one tooth. This information is then utilized to form the consolidation matrix of FIG. 9 wherein a matrix element in FIG. 9 is blackened if a corresponding matrix element in FIG. 8 has a value greater than or equal to one (1). Of course, different minimum values may be set or matrix elements having different total values may be represented by different shades of gray or by different colors. It should be cautioned, however, that a higher number in any matrix grid element does not necessarily mean more intensive contact since different tooth surface flanks are positioned at different angles to the camera and therefore have different light angles.

The consolidated contact pattern represented by FIG. 9 may now be transformed to contact pattern 40 in a tooth projection 42 (FIG. 10) which is a representation of the consolidated tooth contact pattern in the axial plane 44 shown in FIG. 6. Each matrix element of FIG. 9 is transformed according to the relationship:

$$R=(X^2+Y^2)^{1/2} \text{ and } L=Z$$

wherein:

R=radial position of grid element in axial plane;

X=X-axis coordinate of tooth surface grid element;

Y=Y-axis coordinate of tooth surface grid element;

L=axial position of grid element in axial plane;

Z=Z-axis coordinate of tooth surface grid element.

Figure 10:
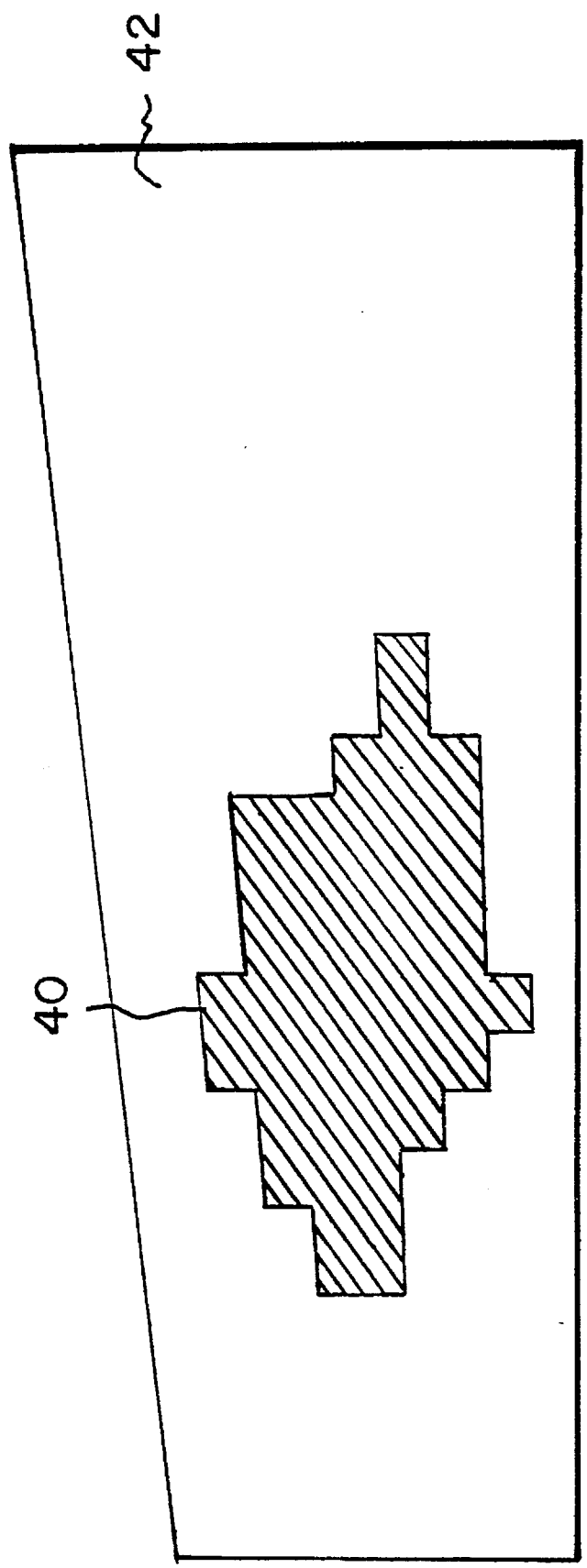
FIG. 10 shows an axial plane projection of the contact pattern shown in FIG. 9.
Figure 11:
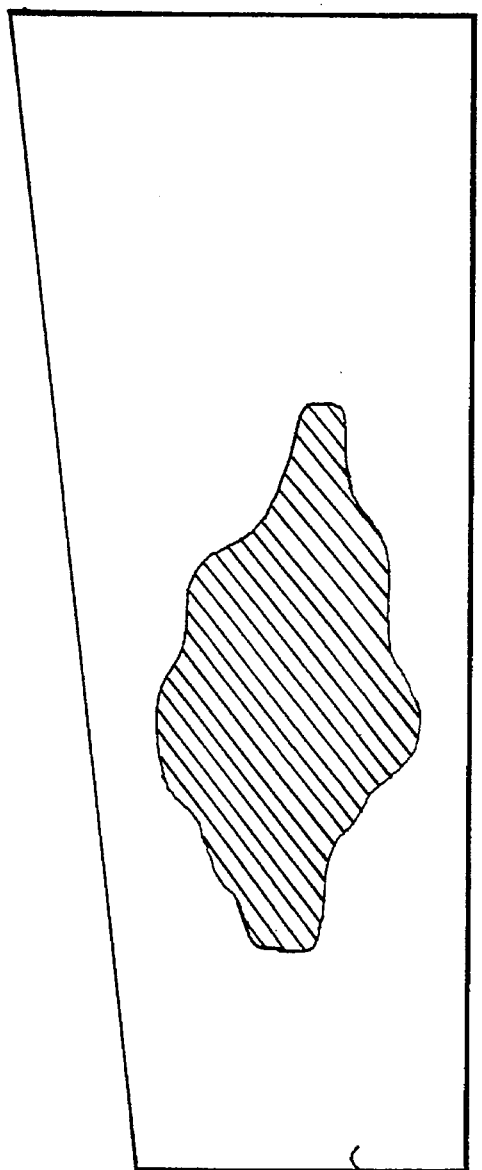
FIG. 11 shows the contact pattern of FIG. 10 modified to remove sharp corners.
Figure 12:
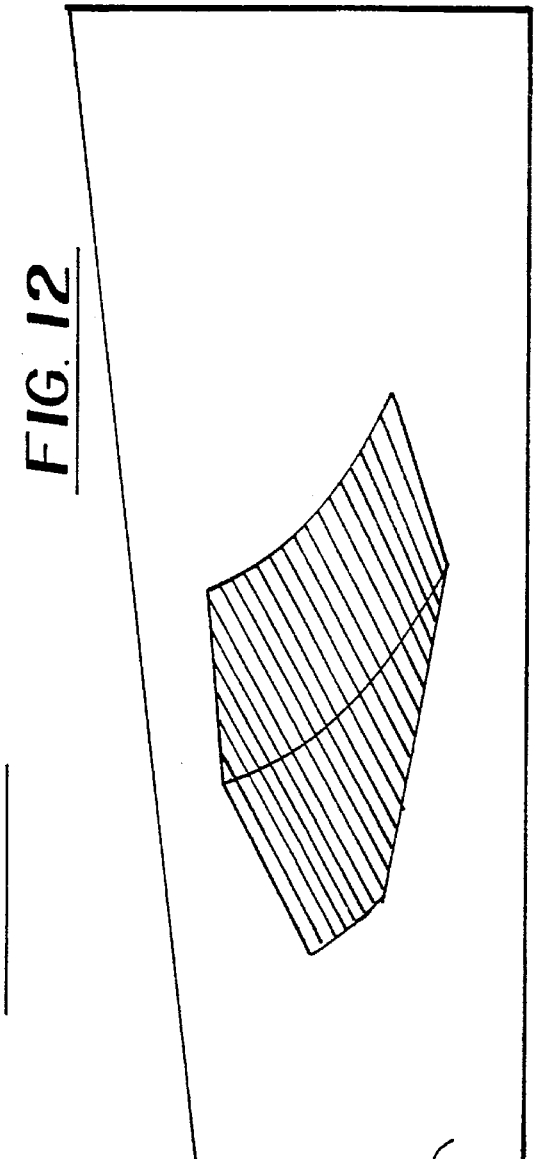
FIG. 12 is an ideal coast side tooth contact pattern obtained by tooth contact analysis methods for a tooth surface on the gear member of FIG. 1.

The form of contact pattern representation of FIG. 10, which may be rounded-off as shown in FIG. 11, matches the form obtained by well known Tooth Contact Analysis (TCA) methods (FIG. 12) and offers a direct comparison between actual contact (FIG. 2) and theoretical contact obtained from TCA methods.

Also, instead of comparing actual contact patterns obtained by the present invention to theoretical TCA contact patterns, the present inventive method may be utilized to prepare master contact patterns from master gear sets which may then form the comparison data for other gear sets.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method of determining a contact pattern representative of contact patterns on successive gear teeth, said method comprising:

providing a first digital image comprising one of (1) the drive side tooth surfaces comprising contact patterns of a plurality of successive gear teeth or (2) the coast side tooth surfaces comprising contact patterns of a plurality of successive gear teeth, providing a second digital image comprising one of (1) respective drive side theoretically correct tooth surfaces of said plurality of successive gear teeth or (2) respective coast side theoretically correct tooth surfaces of said plurality of successive gear teeth, representing each theoretically correct tooth surface by a matrix grid comprising a plurality of grid elements, superimposing said drive side or coast side theoretically correct tooth surfaces on respective said first digital image tooth surfaces to congruently match said first image tooth surfaces to the respective theoretically correct tooth surfaces, identifying grid elements of each theoretically correct tooth surface which contain at least a portion of said contact pattern image, providing a consolidation matrix grid comprising said plurality of grid elements, identifying grid elements in said consolidation matrix corresponding to respective identified grid elements in each of said theoretically correct matrix grids, the identified grid elements in said consolidation matrix representing a consolidated contact image for said plurality of successive gear teeth.

2. The method of claim 1 wherein said first digital image is transformed from a video image.

3. The method of claim 2 wherein said identifying grid elements of each theoretically correct tooth surface comprises assigning a value to each of said identified grids.

4. The method of claim 3 wherein, for each grid element in said consolidation matrix, said identifying grid elements in said consolidation matrix comprises adding said value from the corresponding grid element of each said theoretically correct tooth surface to produce a total grid element value, said total grid element value being assigned to the respective consolidation matrix grid element.

5. The method of claim 4 wherein said value is one.

6. The method of claim 5 wherein each grid element of said consolidation matrix having a total grid value greater than or equal to one is represented in the same manner and each grid element of said consolidation matrix having a total grid value less than one is represented in another manner.

7. The method of claim 1 further comprising transforming said consolidated contact image in said consolidation matrix to an axial plane projection illustrating said consolidated contact image.

8. The method of claim 1 wherein said plurality of theoretically correct tooth surfaces comprises a gear segment which is oriented in a defined coordinate system.

9. The method of claim 1 wherein said first digital image comprises an image from a master gear set member.

\* \* \* \* \*